(12) United States Patent
Dahl et al.

(10) Patent No.: US 8,113,754 B2
(45) Date of Patent: Feb. 14, 2012

(54) FASTENER SYSTEM WITH POSITIVE RETENTION MECHANISM

(75) Inventors: Bruce Alfin Dahl, Kent, WA (US); Ben Christopher Welte, Renton, WA (US)

(73) Assignee: The Boeing Company, Chicago, IL (US)

( * ) Notice: Subject to any disclaimer, the term of this patent is extended or adjusted under 35 U.S.C. 154(b) by 563 days.

(21) Appl. No.: 12/240,067

(22) Filed: Sep. 29, 2008

(65) Prior Publication Data

US 2010/0080666 A1    Apr. 1, 2010

(51) Int. Cl.
    *F16B 39/08*    (2006.01)
(52) U.S. Cl. .................. 411/215; 411/120; 411/320
(58) Field of Classification Search .............. 411/214, 411/215, 320, 197, 200, 120
See application file for complete search history.

(56) References Cited

U.S. PATENT DOCUMENTS

| | | | |
|---|---|---|---|
| 178,834 A * | 6/1876 | Brown .......................... | 411/197 |
| 484,745 A * | 10/1892 | Pugh .............................. | 411/120 |
| 806,404 A * | 12/1905 | Elfborg ........................ | 411/197 |
| 854,590 A * | 5/1907 | Musser ........................ | 411/197 |
| 886,299 A * | 4/1908 | Kenney ........................ | 411/197 |
| 931,409 A * | 8/1909 | Girardot ...................... | 411/197 |
| 946,055 A * | 1/1910 | Kittredge ...................... | 411/197 |
| 1,241,181 A * | 9/1917 | Wilhelm ....................... | 411/201 |
| 1,339,015 A * | 5/1920 | Blake ........................... | 411/197 |
| 1,473,177 A | 11/1923 | Coyne | |
| 2,649,126 A | 8/1953 | Tinnerman | |
| 3,490,508 A | 1/1970 | Nelson | |
| 4,116,104 A | 9/1978 | Kennedy | |
| 4,822,226 A | 4/1989 | Kennedy | |
| 4,940,374 A * | 7/1990 | Gallagher ..................... | 411/120 |
| 5,096,349 A | 3/1992 | Landy et al. | |
| 5,214,945 A | 6/1993 | Martin | |
| 5,245,743 A | 9/1993 | Landy et al. | |
| 5,538,377 A | 7/1996 | Stewart et al. | |
| 6,027,293 A | 2/2000 | Beemer et al. | |
| 6,264,284 B1 * | 7/2001 | Lees ............................. | 411/431 |
| 6,916,144 B2 * | 7/2005 | Lees .............................. | 411/13 |

\* cited by examiner

*Primary Examiner* — Flemming Saether
(74) *Attorney, Agent, or Firm* — Yee & Associates, P.C.

(57) ABSTRACT

An apparatus comprises a fastening member, a complimentary fastening member, and a retainer member. The fastening member has a first end, a second end, a channel located at the first end, outer threads located on an outer surface of the fastening member, and inner threads located on an inner surface of the channel. The outer threads of the fastening member are closer to the first end than the second end. The complimentary fastening member has a channel and inner threads located within the channel. The inner threads of the complimentary fastening member are capable of engaging the outer threads of the fastening member. The retainer member has a threaded end. The retainer member is capable of entering the channel of the complimentary fastening member and the threaded end of the retainer member is capable of engaging the inner threads of the fastening member.

21 Claims, 5 Drawing Sheets

FASTENER SYSTEM WITH POSITIVE RETENTION MECHANISM

BACKGROUND INFORMATION

1. Field

The present disclosure relates generally to manufacturing and in particular to fastening parts to each other. Still more particularly, the present disclosure relates to a method and apparatus for a fastening system with a positive retention mechanism.

2. Background

A fastening system has one or more hardware devices used to mechanically join and/or attach two or more parts together. For example, a fastening system may include a rivet, a screw, or a bolt and nut combination. A bolt typically has external threads designed to be inserted through a hole in assembled parts. The bolt may be tightened or released using a nut that engages the threads.

Bolts are used in aircraft manufacturing to secure various parts in the aircraft to each other. For example, a bolt and nut may be used to secure a stringer to a rib. As another example, a bolt and nut may be used to secure an electrical module to a structural component in the aircraft.

In some applications, a locking nut is used to help ensure that the bolt and nut do not become disengaged from each other. A locking nut may be used in which a portion of the nut has a slightly oval shape relative to a circular shape of the bolt. In other implementations, the nut on the end of the bolt on one side of the structure and the opposite end of the bolt on the other side of the structure may both be secured to prevent either of the components from turning. These structures are objects other than the parts being secured by the bolt and the nut.

The securing of the bolt and the nut to other structures are used to prevent rotation of both the bolt and nut. In yet other examples, the structures may allow some rotation but prevent separation of the components. In still other applications, two or three bolts and nuts may be used instead of a single bolt and nut system to provide additional redundancy.

In yet other applications, adhesives may be placed into the threads to lock the bolt and nut in place as yet an additional mechanism to prevent rotation of the bolt and nut. These adhesives may include, for example, an adhesive resin that may harden in the absence of air. An example of this type of resin is a Loctite® resin. Loctite® is a registered trademark of the Henkel Corporation. Patch elements and cotter pins also may be used to provide additional features to limit movement of a bolt and/or nut.

Although these types of systems provide additional redundancy to insure that parts are secured to each other, these types of systems may be complex and may add weight to the aircraft. For example, if a particular structure in an aircraft normally uses 1,000 bolts and nuts, to add an additional bolt and nut to each of those would greatly increase the weight of the aircraft.

In another example, it may be difficult to locate space or structures to which both the bolt and nut can be secured to prevent the bolt and nut from turning.

The use of cotter pins requires a hole to be present through the nut and bolt. Fastener strength requirements may prevent the use of this type of fastening mechanism. Further, environmental exposure may make it unfeasible to use a resin-based retention mechanism.

Therefore, it would be advantageous to have a method and apparatus to overcome the problems described above.

SUMMARY

In one advantageous embodiment, an apparatus comprises a fastening member, a complimentary fastening member, and a retainer member. The fastening member has a first end, a second end, a channel located at the first end, outer threads located on an outer surface of the fastening member, and inner threads located on an inner surface of the channel. The outer threads of the fastening member are closer to the first end than the second end. The complimentary fastening member has a channel and inner threads located within the channel. The inner threads of the complimentary fastening member are capable of engaging the outer threads of the fastening member. The retainer member has a threaded end. The retainer member is capable of entering the channel of the complimentary fastening member and the threaded end of the retainer member is capable of engaging the inner threads of the fastening member.

In another advantageous embodiment, a fastening system comprises a bolt, a nut, a retainer, a retainer block, and a rod. The bolt has a first end, a second end, a surface closer to the first end, and a threaded channel at the first end. The nut has an outer surface and a threaded hole. The threaded hole is capable of receiving the first end of the bolt and engaging the threaded surface to secure the nut to the bolt. The retainer has a hole capable of engaging the outer surface of the nut. The retainer block has a surface and a threaded end. The threaded end is capable of engaging the threaded channel of the bolt to secure the retainer block to the first end of the threaded channel. The surface is capable of engaging the retainer. The rod is capable of securing the retainer block to the retainer, wherein movement of the nut is restricted.

In yet another advantageous embodiment, a method for fastening a plurality of parts is present. The method includes placing a bolt through a first end of a hole in the plurality of parts. The method also involves fastening a nut to an end of the bolt extending out of a second end of the hole. Further, the method involves coupling a retainer block to the end of the bolt.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
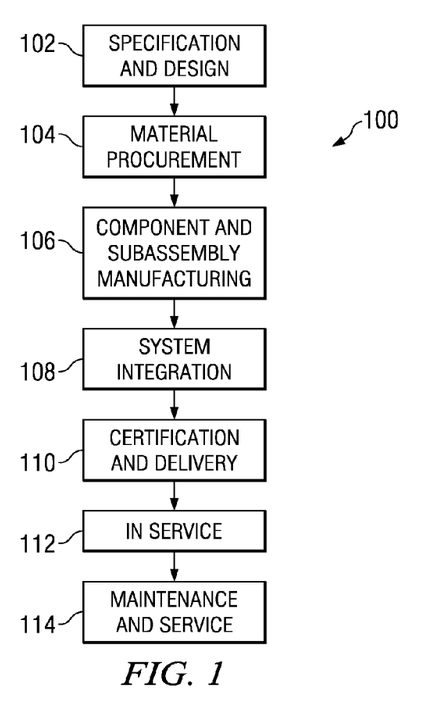
FIG. 1 is a diagram illustrating an aircraft manufacturing and service method in accordance with an advantageous embodiment.
Figure 2:
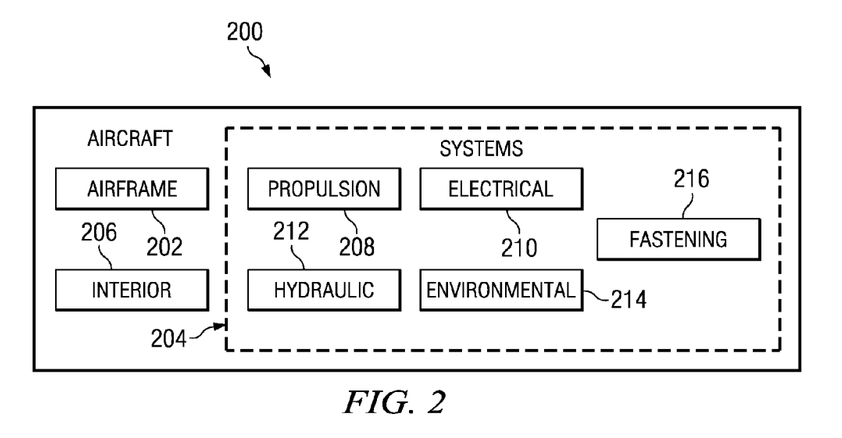
FIG. 2 is a diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and fastening systems 216. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments may be used to secure different parts in airframe 202 to each other during component and subassembly manufacturing 106. In other advantageous embodiments, different components in interior 206 may be secured or assembled during system integration 108 using a fastening system according to an advantageous embodiment. Another advantageous embodiment may be used during maintenance and service 114 to perform repairs or additions to aircraft 200.

The advantageous embodiments provide a method and apparatus for securing a plurality of parts to each other. In one advantageous embodiment, a fastening member has a first end, a second end, a channel located at the first end, outer threads located on an outer surface of a fastening member, and inner threads on an inner surface of the channel. The outer threads are closer to the first end and the second end in this example.

A complimentary fastening member has a channel and inner threads located within the channel for the complimentary fastening member. These inner threads of the complimentary fastening members are capable of engaging the outer threads of the fastening member. The apparatus also has a retainer member with a threaded end. The retainer member is capable of entering the channel of the complimentary fastening member and the threaded end of the retainer member is capable of engaging the inner threads of the fastening member.

Figure 3:
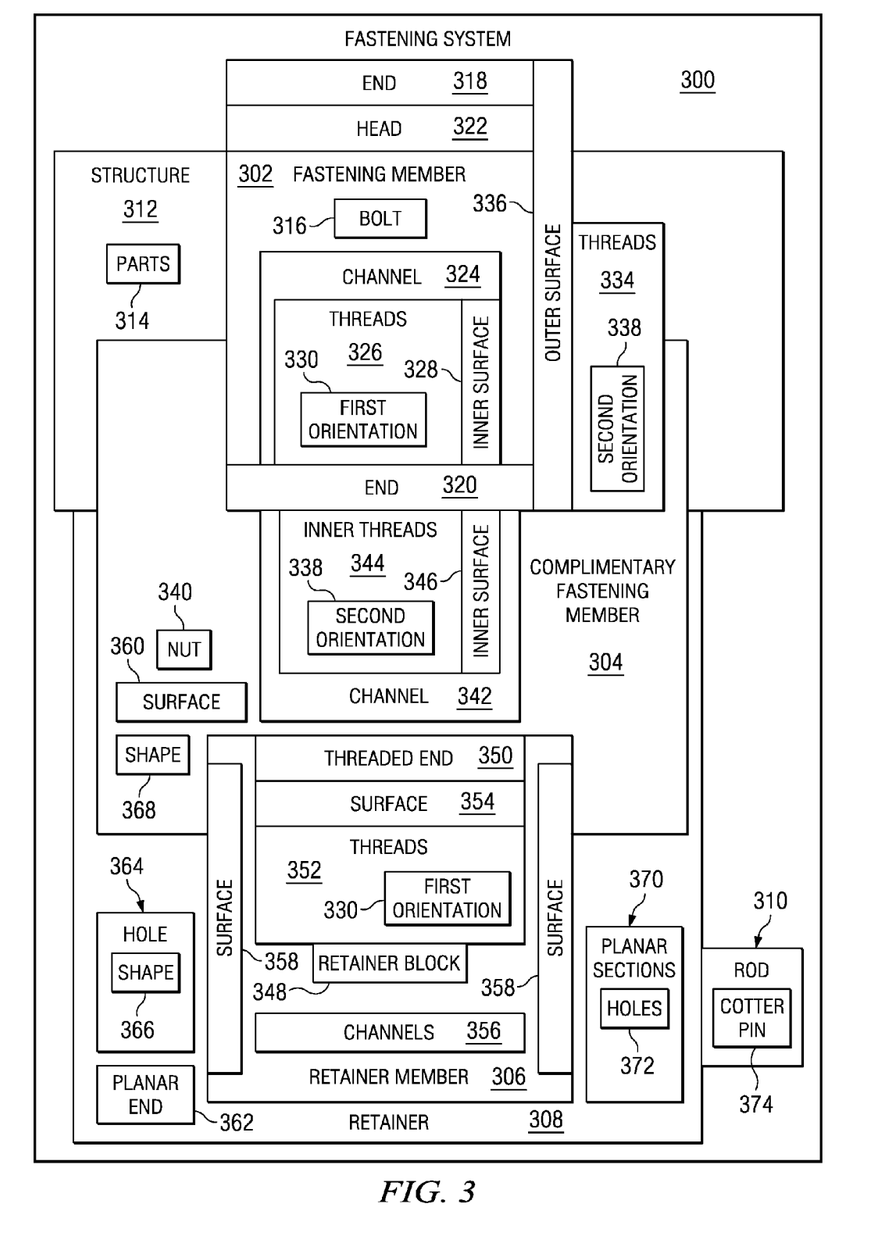
FIG. 3 is a diagram of a fastening system in accordance with an advantageous embodiment.

With reference now to FIG. 3, a diagram of a fastening system is depicted in accordance with an advantageous embodiment. In this example, fastening system 300 is an example of a fastening system that may be used within aircraft manufacturing service method 100 to secure parts to each other.

In this example, fastening system 300 includes fastening member 302, complimentary fastening member 304, retainer member 306, retainer 308, and rod 310. Fastening system 300 may be used to secure structure 312. More specifically, fastening system 300 may be used to secure parts 314 within structure 312 to each other.

In this example, fastening member 302 may take the form of bolt 316. Fastening member 302 has end 318 and end 320. End 318 has head 322, while end 320 has channel 324. Channel 324 has threads 326 on inner surface 328 of channel 324. Threads 326 have first orientation 330. In these examples, this first orientation is a left-handed orientation for threads 326. Fastening member 302 also has threads 334 on outer surface 336.

In this illustrative example, threads 334 are closer to end 320 than end 318 of fastening member 302. Although threads 334 are only shown on a portion of outer surface 336 of fastening member 302, threads 334 may extend over additional surface of or all of outer surface 336 depending on the particular implementation. Threads 334 have second orientation 338, which is a right-handed orientation for threads 334 in these examples.

Complimentary fastening member 304 may take the form of nut 340. Fastening member 304 has channel 342 with inner threads 344 located on inner surface 346 of channel 342. Inner threads 344 also have second orientation 338. Channel 342 has a size and shape capable of receiving fastening member 302. Inner threads 344 of complimentary fastening member 304 may engage threads 334 of fastening member 302 in a manner that secures complimentary fastening member 304 to fastening member 302.

In this example, retainer member 306 may take the form of retainer block 348. Retainer member 306 has threaded end 350 on which threads 352 are present on surface 354 of threaded end 350. Threads 352 have first orientation 330. Retainer member 306 also has channels 356, which are capable of receiving rod 310.

In this example, inner threads 344 of complimentary fastening member 304 may be engaged to threads 334 of fastening member 302 to fasten structure 312. Threaded end 350 of retainer member 306 may then be engaged into threads 326 of channel 324 in fastening member 302. When threaded end 350 of retainer member 306 is engaged in channel 324 of fastening member 302, surface 358 of retainer member 306 may engage surface 360 of complimentary fastening member 304 in a manner that prevents complimentary fastening member 304 from turning in a manner that loosens or disengages complimentary fastening member 304 from fastening member 302.

In some implementations, surface 358 may not engage surface 360 until complimentary fastening member 304 loosens or moves away from end 320 of fastening member 302. In this type of implementation, retainer member 306 may prevent complimentary fastening member 304 from being entirely disengaged from fastening member 302.

Retainer 308 has planar end 362 with hole 364 which may receive complimentary fastening member 304. In these examples, hole 364 has shape 366, which is capable of engaging shape 368 of complimentary fastening member 304.

For example, if complimentary fastening member 304 takes the form of nut 340 as a 12-point nut, nut 340 has 12 ridges. With this type of configuration, shape 366 has a shape configured to engage those ridges. In other words, shape 366 of hole 364 in retainer 308 engages shape 368 of complimentary fastening member 304 in a manner such that retainer 308 does not rotate when complimentary fastening member 304 is placed through hole 364.

Further, retainer 308 also has planar sections 370 with holes 372. Planar sections 370 may be a number of sections that engage or touch retainer member 306. Holes 372 are capable of receiving rod 310.

When retainer 308 is placed onto complimentary fastening member 304, holes 372 may be aligned with one or more of channels 356. This alignment allows rod 310 to be placed through holes 372 in channels 356. In these examples, rod 310 may be cotter pin 374.

With rod 310 placed through holes 372 and one or more of channels 356, retainer member 306 may be secured to retainer 308 in a fashion such that retainer member 306 will not become disengaged from retainer 308. Further, the securing of retainer 308 to retainer member 306 prevents complimentary fastening member 304 from rotating because complimentary fastening member 304 has shape 368 engaged with shape 366 of hole 364 in retainer 308.

This engagement locks complementary fastening member 304 to retaining member 306. This configuration prevents complimentary fastening member 304 from moving relative to fastening member 302 because first orientation 330 of threads 326 in channel 324 of fastening member 302 and threads 352 of threaded end 350 of retainer member 306 are in opposition to second orientation 338 of threads 334 on outer surface 336 of fastening member 302 and inner threads 334 in channel 342 of complementary fastening member 304, which prevents rotation.

In other words, movement of complementary fastening member 304 away from end 318 of fastening member 302 may be restricted. In these different advantageous embodiments, restricted means that complementary fastening member 304 may have reduced and/or no movement while fastening parts 314 to each other.

The different components in fastening system 300 may be constructed from various materials. The type of material may vary depending on the implementation. For example, fastening member 302, complimentary fastening member 304, and retainer member 306 may be constructed from the same or different materials. These materials may include, for example, without limitation, steel, aluminum, titanium, a composite material, plastic, or some other suitable material.

The illustration of fastening system 300 in FIG. 3 is not meant to imply architectural or physical limitations to the manner in which the different advantageous embodiments may be implemented. In other advantageous embodiments, components in addition to or in place of the ones illustrated may be used. For example, depending on the implementation, a washer also may be used with fastening system 300. In other advantageous embodiments, fastening system 300 only may have fastening member 302, complimentary fastening member 304, and retainer member 306.

With this type of implementation, retainer member 306 may have a size that may be larger than channel 342 in complementary fastening member 304. In this manner, when threads 352 on threaded end 350 of retainer member 306 engage threads 326 in channel 324 of fastening member 302, complementary fastening member 304 may be restricted in movement. In other words, retainer member 306 may have a size and/or shape that may prevent complementary fastening member 304 from becoming disengaged from fastening member 302 when these components are assembled to each other. In still other advantageous embodiments, planar sections 370 may be implemented as a single retaining section or side.

Figure 4:
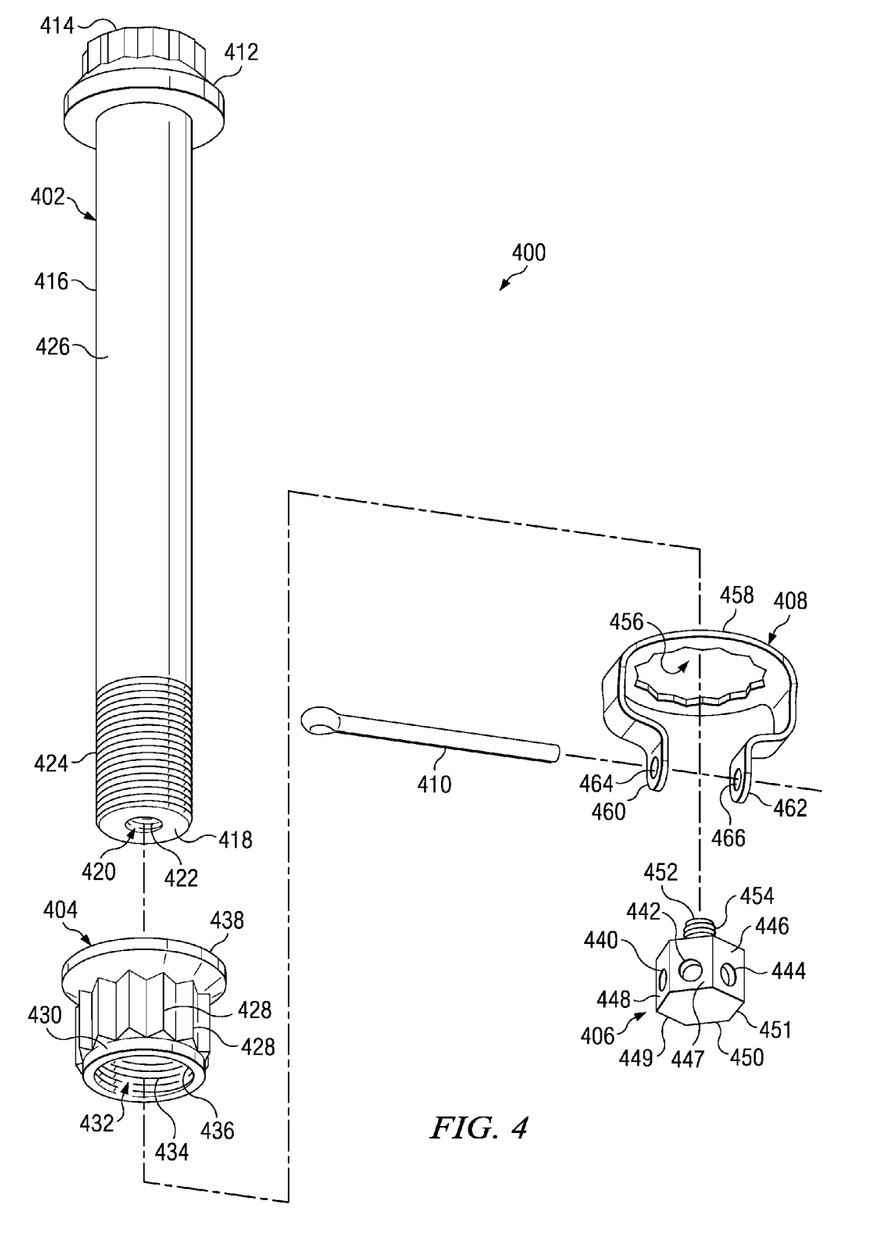
FIG. 4 is a diagram of an exploded view of a fastening system in accordance with an advantageous embodiment.

With reference now to FIG. 4, a diagram of an exploded view of a fastening system is depicted in accordance with an advantageous embodiment. In this example, fastening system 400 is an example of one implementation of fastening system 300 in FIG. 3. Fastening system 400 includes bolt 402, nut 404, retainer block 406, retainer 408, and cotter pin 410.

Bolt 402 has head 412 at end 414. Shaft 416 extends from end 414 to end 418. Channel 420 is located in end 418 and has threads 422. Threads 424 are located closer to end 418 on surface 426 of shaft 416. Head 412 on end 414 may prevent bolt 402 from sliding through a hole in a part.

Nut 404 has ridges 428 on surface 430. In this example, ridges 428 form a surface for a 12-point nut. Nut 404 has channel 432 with threads 434 on surface 436 of channel 432. Channel 432 may receive end 418 of bolt 402 in a manner such that threads 424 engage threads 434 to secure nut 404 onto bolt 402. Nut 404 may receive end 418 at end 438.

Retainer block 406 has a hexagonal shape with channels 440, 442, and 444 extending through sides 446, 447, 448, 449, 450 and 451 of retainer block 406. Retainer block 406 also has threaded end 452 with threads 454. Threads 454 on threaded end 452 are capable of engaging threads 422 in channel 420 to secure retainer block 406 to bolt 402.

Retainer 408 has hole 456 in planar end 458, which has a shape capable of engaging ridges 428 in a manner that prevents retainer 408 from rotating when placed onto nut 404. Retainer 408 also has planar sections 460 and 462 with holes 464 and 466 in planar sections 460 and 462. These planar sections extend from planar end 458 in which hole 456 is located. Planar sections 460 and 462 are capable of being located around parallel to and/or touch two of sides 446, 447, 448, 449, 450, and 451 on retainer block 406.

Holes 464 and 466 may align with one of channels 440, 442, and 444. When these holes are aligned with a channel, cotter pin 410 may be placed through the holes and the aligned channel to secure retainer 408 to retainer block 406. This assembly prevents nut 404 from turning on bolt 402. In this manner, bolt 402 and nut 404 may be positively retained to each other.

Further, threads 424 on bolt 402 and threads 434 in nut 404 both have the same orientation. In this example, the orientation is a right-handed orientation. Threads 422 in channel 420 of bolt 402 and threads 454 on threaded end 452 of retainer block 406 have an opposite or left-handed orientation. This type of orientation would result in tightening of retainer block 406 to bolt 402 if any rotation of the nut occurred. As a result, by securing retainer 408 to retainer block 406 with retainer 408 being secured to nut 404, nut 404 may be positively retained to bolt 402.

This type of fastening system provides an advantage over currently available fastening systems, because the positive retention of nut 404 is achieved all with fastening system 400. Attachments to other structures or parts are unnecessary with fastening system 400. Further, this type of fastening system also avoids having to employ additional bolts and nuts to provide redundancy with currently used systems.

Figure 5:
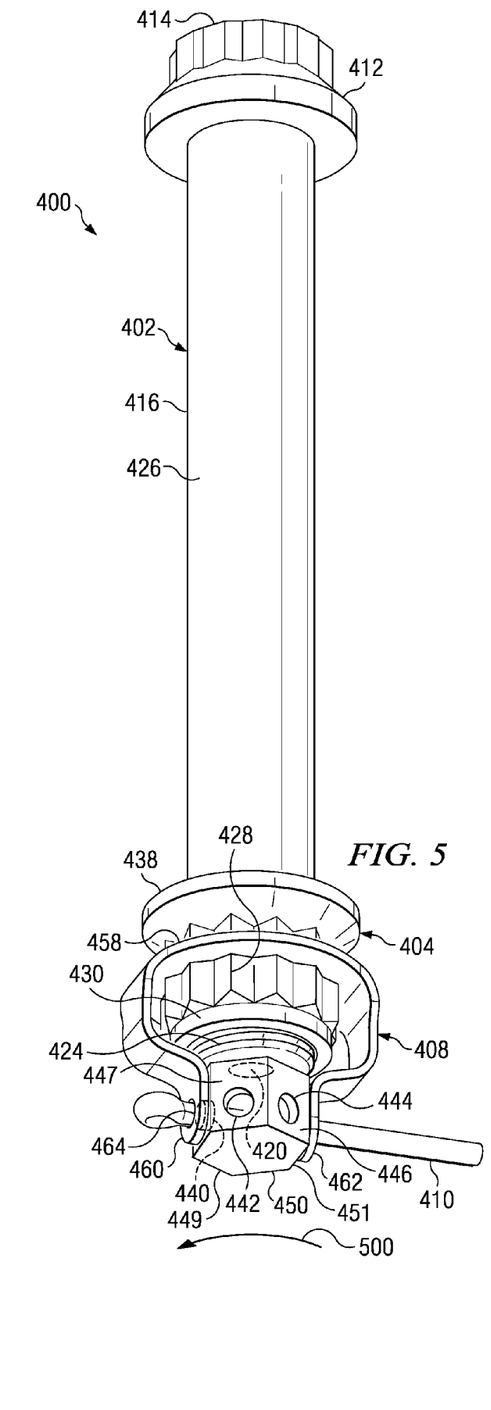
FIG. 5 is an assembled view of a fastening system in accordance with an advantageous embodiment.

With reference now to FIG. 5, an assembled view of a fastening system is depicted in accordance with an advantageous embodiment. In this example, fastening system 400 is shown in an assembled view in which nut 404 has been secured to bolt 402. Retainer 408 has been placed onto nut 404. Retainer block 406 has been secured to end 418 of bolt 402. Cotter pin 410 has been placed through holes 462 and 464 and channel 440.

As can be seen with this assembled state, if retainer block 406 turns in the direction of arrow 500, retainer block 500 will tighten within the channel. If nut 404 turns in the direction of arrow 500, nut 404 would normally become looser. In this case, retainer block 406 and nut 404 cannot turn, because retainer 408 is secured to retainer block 406 and nut 404 with cotter pin 410.

In other advantageous embodiments, nut 404 also may have a locking feature in which nut 404 is slightly oval with respect to the circular shape of bolt 402. As a result, when nut 404 is attached to bolt 402, the threads will remain secure to each other in a locked fashion. Of course, other locking mechanisms may be used depending on the particular implementation.

Figure 6:
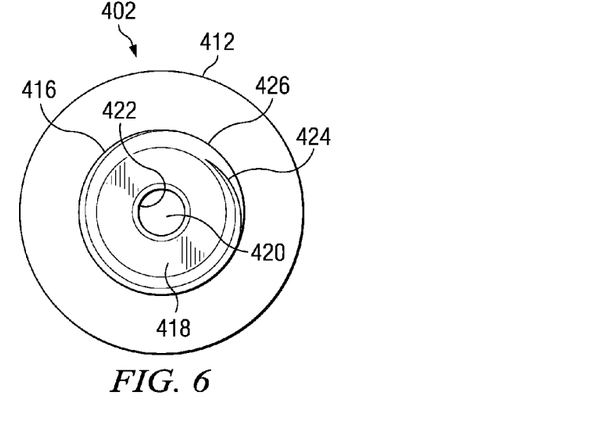
FIG. 6 is a top view of a bolt in accordance with an advantageous embodiment.

Turning to FIG. 6, a top view of a bolt is depicted in accordance with an advantageous embodiment. In this view, end 418 with channel 420 of bolt 402 is depicted in a top view.

Figure 7:
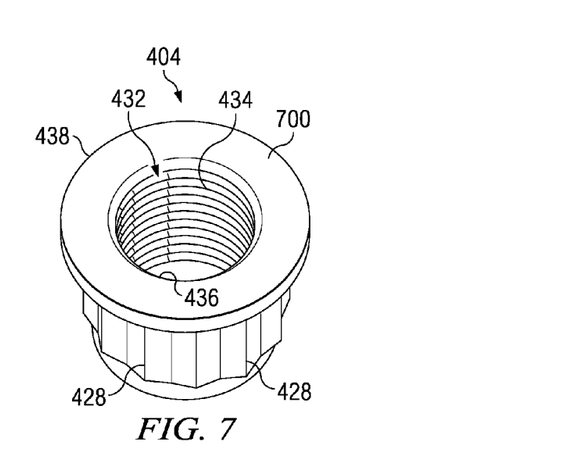
FIG. 7 is a perspective view of a nut in accordance with an advantageous embodiment.

With reference to FIG. 7, a perspective view of a nut is depicted in accordance with an advantageous embodiment. Nut 402 is shown from a perspective view of end 438. Surface 700 in this view may touch or abut to a part when fastening system 400 is used to secure two or more parts to each other.

Figure 8:
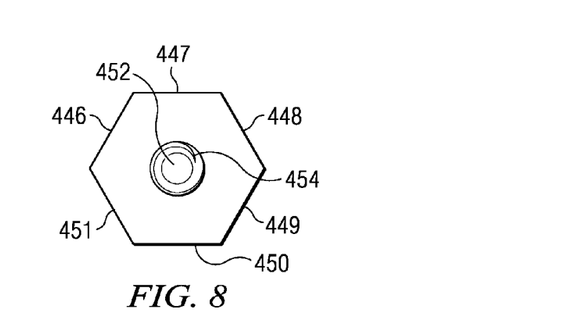
FIG. 8 is a bottom view of a retainer block in accordance with an advantageous embodiment.

In FIG. 8, a bottom view of a retainer block is depicted in accordance with an advantageous embodiment. In this example, a view of retainer block 406 is depicted from threaded end 452.

Figures 9, 10, 11:
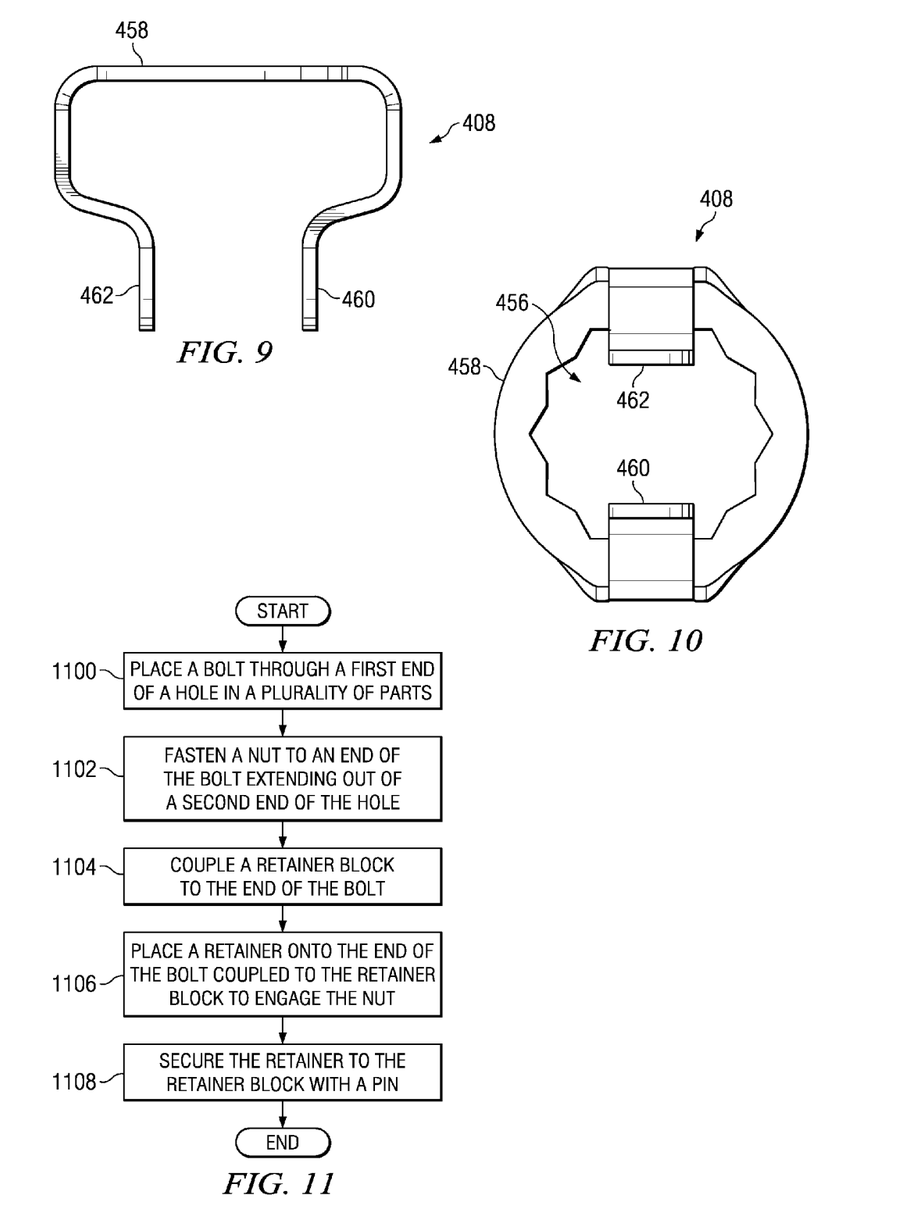
FIG. 9 is a side view of a retainer in accordance with an advantageous embodiment.
FIG. 10 illustrates a top view of a retainer in accordance with an advantageous embodiment.
FIG. 11 is a flowchart of a process for securing parts in accordance with an advantageous embodiment.

With reference now to FIG. 9, a side view of a retainer is depicted in accordance with an advantageous embodiment. FIG. 10 illustrates a top view of a retainer in accordance with an advantageous embodiment.

With reference now to FIG. 11, a flowchart of a process for securing parts is depicted in accordance with an advantageous embodiment. The process illustrated in FIG. 11 may be implemented using fastening system 300 in FIG. 3 or fastening system 400 in FIG. 4.

The process begins by placing a bolt through a first end of a hole in a plurality of parts (operation 1100). The process then fastens a nut to the end of a bolt extending out of a second end of the hole in the parts (operation 1102). A retainer block is coupled to the end of the bolt (operation 1104). The retainer block is coupled to a channel with threads in the bolt. A retainer is placed onto the end of the bolt on which the retainer block has been coupled to engage the nut (operation 1106). The retainer is then secured to the retainer block with a pin (operation 1108), with the process terminating thereafter.

Thus, the different advantageous embodiments provide a method and apparatus for securing parts to each other with a fastening system. The fastening system in the different advantageous embodiments provides a positive retention mechanism. In the different advantageous embodiments, a bolt may have a channel at one end with threads within the channel. The bolt also may have threads on an outer surface.

A nut may be secured to threads on the outer surface. A retaining block may be secured to the end of the bolt in the channel with the threads. Further, a retainer may be placed over the nut with the retainer being secured to the retainer block by a pin. This type of configuration may prevent the nut and/or bolt from turning in a manner that causes the nut to move away from the other end of the bolt to which the nut is secured.

This type of fastening system reduces a need to have additional fasteners to provide redundancy in case one fastener becomes unsecured or disassembled during use. Further, this type of fastening system also avoids having to locate space or structures to which the bolt and nut may be secured to prevent loosening.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a fastening member having a first end, a second end, a channel located at the first end, outer threads located on an outer surface of the fastening member, and inner threads on an inner surface of the channel, the outer threads are closer to the first end than the second end;
a complimentary fastening member having a channel and inner threads located within the channel, the inner threads of the complimentary fastening member are capable of engaging the outer threads of the fastening member;
a retainer member having a threaded end, the retainer member is capable of entering the channel of the complimentary fastening member and the threaded end of the retainer member is capable of engaging the inner threads of the fastening member;

a retainer having a planar end, a hole in the planar end, and a number of planar sections extending from the planar end, the hole is capable of receiving the complimentary fastening member and engaging an outer surface of the complimentary fastening member and the number of planar sections is capable of being secured to the retainer member, the retainer member having a number of channels; and a rod capable of being placed into a particular channel in the number of channels in the retainer member.

2. The apparatus of claim 1, wherein the outer threads of the fastening member have a first orientation and the inner threads of the fastening member have a second orientation opposite to the first orientation.

3. The apparatus of claim 2, wherein the inner threads of the complimentary fastening member have the first orientation.

4. The apparatus of claim 3, wherein the threaded end of the retainer member has the second orientation.

5. The apparatus of claim 4, wherein the first orientation is right-handed and the second orientation is left-handed.

6. The apparatus of claim 1, wherein the fastening member is a bolt, the complimentary fastening member is a nut, and the retainer member is a retainer block.

7. The apparatus of claim 1, wherein the complimentary fastening member has a locking mechanism.

8. The apparatus of claim 1, wherein the complimentary fastening member is a 12 point nut.

9. The apparatus of claim 1 further comprising:
a plurality of aircraft parts, wherein the fastening member, the complimentary fastening member, and the retainer member secure the plurality of aircraft parts to each other when the fastening member, the complimentary fastening member, and the retainer member are in an assembled state.

10. The apparatus of claim 1, wherein the retainer member has a shape restricting the complementary fastening member from becoming disengaged from the fastening member.

11. The apparatus of claim 1 wherein the outer surface of the complimentary fastening member comprises a plurality of ridges.

12. The apparatus of claim 11 wherein the hole of the retainer is configured to engage the plurality of ridges.

13. The apparatus of claim 1 wherein the planar sections of the retainer define a plurality of planar section holes and wherein at least one hole of the planar section holes substantially aligns with a channel in the number of channels of the retainer member.

14. A fastening system comprising:
a bolt having a first end, a second end, a threaded surface closer to the first end, and a threaded channel at the first end;
a nut having an outer surface and a threaded hole, the threaded hole is capable of receiving the first end of the bolt and engaging the threaded surface to secure the nut to the bolt;
a retainer, the retainer having a substantially planar end and a number of planar sections extending from the substantially planar end, a hole in the substantially planar end capable of engaging the outer surface of the nut, the planar sections of the retainer define a plurality of planar section holes;
a retainer block having a surface and a threaded end, the threaded end is capable of engaging the threaded channel to secure the retainer block to a first end of the channel and the surface is capable of engaging the retainer, the retainer block defining a retainer block channel that substantially aligns with at least one hole in the plurality of planar section holes; and
a rod capable of securing the retainer block to the retainer, such that movement of the nut is restricted.

15. The fastening system of claim 14, wherein the threaded surface of the bolt and the threaded hole in the nut have a first orientation and wherein the threaded channel of the bolt and the threaded end of the retainer block have a second orientation.

16. The fastening system of claim 15, wherein the first orientation is right-handed and the second orientation is left-handed.

17. The fastening system of claim 14, wherein the rod is a cotter pin.

18. The fastening system of claim 14, wherein the nut is a 12 point nut.

19. The fastening system of claim 14, wherein the nut has a locking mechanism.

20. The fastening system of claim 14 wherein the retainer block has a substantially hexagonal shape.

21. A fastening system comprising:
a bolt having a first end, a second end, a threaded surface closer to the first end, and a threaded channel at the first end;
a nut having an outer surface and a threaded hole, the threaded hole receives the first end of the bolt and engages the threaded surface to secure the nut to the bolt;
a retainer, the retainer having a substantially planar end and a number of planar sections extending from the substantially planar end, the retainer defining a hole in the substantially planar end that engages the outer surface of the nut, the planar sections of the retainer define a plurality of planar section holes;
a retainer block having a surface and a threaded end, wherein the threaded end engages the threaded channel to secure the retainer block to the bolt, the retainer block defining a retainer block channel that substantially aligns with at least one hole in the plurality of planar section holes;
a rod disposed through the retainer block channel and the at least one hole in the plurality of planar sections; and
the threaded surface of the bolt and the threaded hole in the nut have a first orientation and the threaded channel of the bolt and the threaded end of the retainer block have an orientation different from the first orientation.

* * * * *